United States Patent
Wang et al.

(10) Patent No.: US 8,197,246 B1
(45) Date of Patent: Jun. 12, 2012

(54) PLASTIC INJECTION MOLD

(75) Inventors: Xian-yun Wang, Tu Cheng (TW);
Xiao-ping Wu, Tu Cheng (TW);
Kun-hsueh Chiang, Tu Cheng (TW)

(73) Assignee: Cheng Uei Precision Industry Co., Ltd., Tu Cheng, Taipei (TW)

( * ) Notice: Subject to any disclaimer, the term of this patent is extended or adjusted under 35 U.S.C. 154(b) by 60 days.

(21) Appl. No.: 12/960,404

(22) Filed: Dec. 3, 2010

(51) Int. Cl.
*B29C 45/44* (2006.01)

(52) U.S. Cl. .................. 425/556; 264/334; 425/DIG. 58

(58) Field of Classification Search .................. 425/556, 425/DIG. 58; 264/334
See application file for complete search history.

(56) References Cited

U.S. PATENT DOCUMENTS

| | | | |
|---|---|---|---|
| 4,889,480 A * | 12/1989 | Nakamura et al. | 425/DIG. 58 |
| 6,491,513 B1 * | 12/2002 | Schneider | 425/556 |
| 7,381,051 B2 * | 6/2008 | Wang et al. | 425/DIG. 58 |
| 2005/0208172 A1 * | 9/2005 | Buttigieg | 425/DIG. 58 |
| 2006/0045933 A1 * | 3/2006 | Chen et al. | 425/DIG. 58 |

* cited by examiner

*Primary Examiner* — Tim Heitbrink
(74) *Attorney, Agent, or Firm* — Cheng-Ju Chiang

(57) ABSTRACT

Disclosed is a plastic injection mold, comprising a female mold, a male mold corresponding to the female, an inclined pushing mechanism, a parting lock and a puller. The female mold comprises an accepting space. The inclined pushing mechanism comprises an inclined pusher and an inclined pushing seat, which a parting lock hole and a guide rail are formed therein. The inclined pusher is installed on the guide rail. The parting lock is fixed on the male mold. The puller is fixed on female mold. As the plastic injection mold is utilized to form a product with barb, a present slide mechanism can be replaced by the inclined pushing mechanism with the parting lock and the puller. The plastic injection mold has a simple structure and can be easily designed and manufactured. Accordingly, the plastic injection mold can be utilized to manufacture the product with barb with small size.

2 Claims, 6 Drawing Sheets

PLASTIC INJECTION MOLD

BACKGROUND OF THE INVENTION

1. Field of the Invention

The present invention generally relates to a molding, and more particularly, to a plastic injection mold.

2. Description of Prior Art

Please refer to FIG. 1, which shows a structure diagram of a product 80 with a barb 82. The product 80 comprises a base 81. The base 81 comprises the barb 82 outstretching from edge of the base 81 and toward the middle of the base 81.

A mold with slide mechanism is generally utilized for manufacturing such a product. Nevertheless, the structure of the mold with slide mechanism is more complicated and the slide mechanism needs to occupy a larger space. The design and the manufacture of the mold become much difficult when the appearance of the product 80 with barb 82 is smaller.

SUMMARY OF THE INVENTION

For solving the drawbacks of aforementioned prior art, the present invention provides a plastic injection mold which has a simple structure and can be easily designed and manufactured.

For realizing the aforesaid objective, the plastic injection mold of the present invention comprises a female mold, a male mold, an inclined pushing mechanism, a parting lock and a puller. The female mold comprises a female mold plate and a female mold core. An accepting space is formed in the female mold plate. An accepting slot and a guide hole connecting with the accepting slot and extending aslant are opened in the female mold core; the male mold is positioned corresponding to the female mold and comprises a male mold plate and a male mold core; the inclined pushing mechanism is up and down movably positioned in the accepting space of the female mold and comprises an inclined pushing seat, relatively movably installed on the female mold plate and an inclined pusher, and the inclined pushing seat comprises a parting lock hole, a trip limit wall and a transversely extending guide rail, and the inclined pusher comprises a molding unit and an aslant extending inclined pushing bar, and the molding unit is accepted in the accepting slot, and one end of the inclined pushing bar passes through the guide hole and is slidably installed on the guide rail of the inclined pushing seat; the parting lock is fixed on the male mold plate and in accordance with the parting lock hole of the inclined pushing seat; and the puller is fixed on female mold, and the puller can act to the trip limit wall to drive the inclined pushing seat thereby; wherein the female mold core, the male mold core and the molding unit enclose to form a cavity when the plastic injection mold is closed.

As aforementioned, as the plastic injection mold of the present invention is utilized to form a product with barb, the slide mechanism of prior art can be replaced by the installed inclined pushing mechanism with functions of the parting lock and the puller. The plastic injection mold has a simple structure and can be easily designed and manufactured. Accordingly, the plastic injection mold can be utilized to manufacture the product with barb with small size.

DETAILED DESCRIPTION OF THE INVENTION

Figure 1:
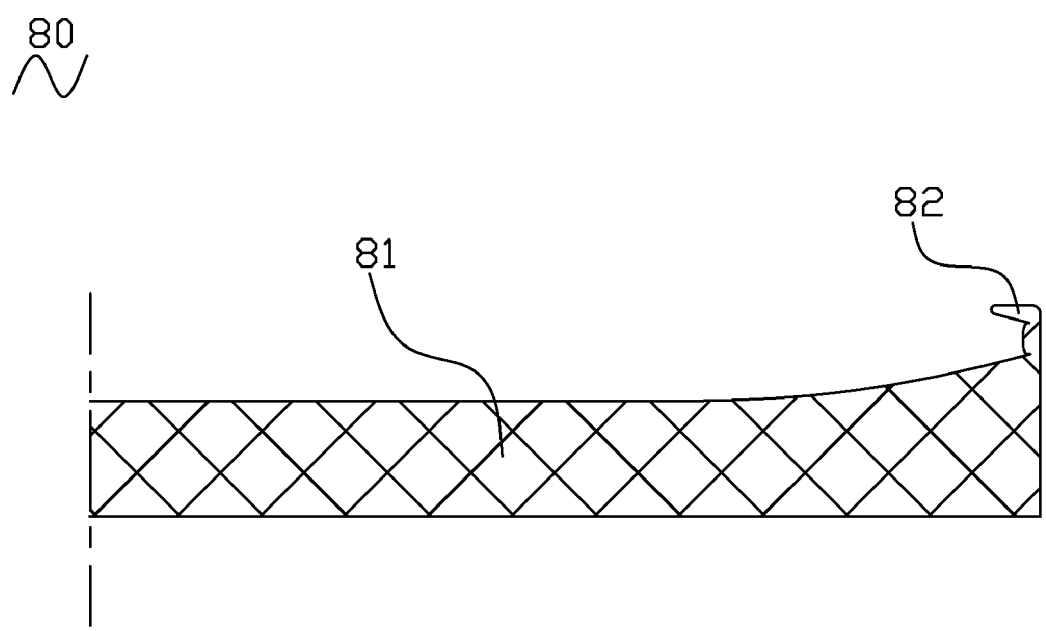
FIG. 1 shows a structure diagram of a product with barb.

For a better understanding the aforementioned content of the present invention, preferable embodiments are illustrated in accordance with the attached figures for further explanation. Please refer to FIG. 1, FIG. 2 and FIG. 3. In this embodiment, the shaping mold for products with circular hole is employed for shaping an insulating base 100 of an audio jack.

Figure 2:
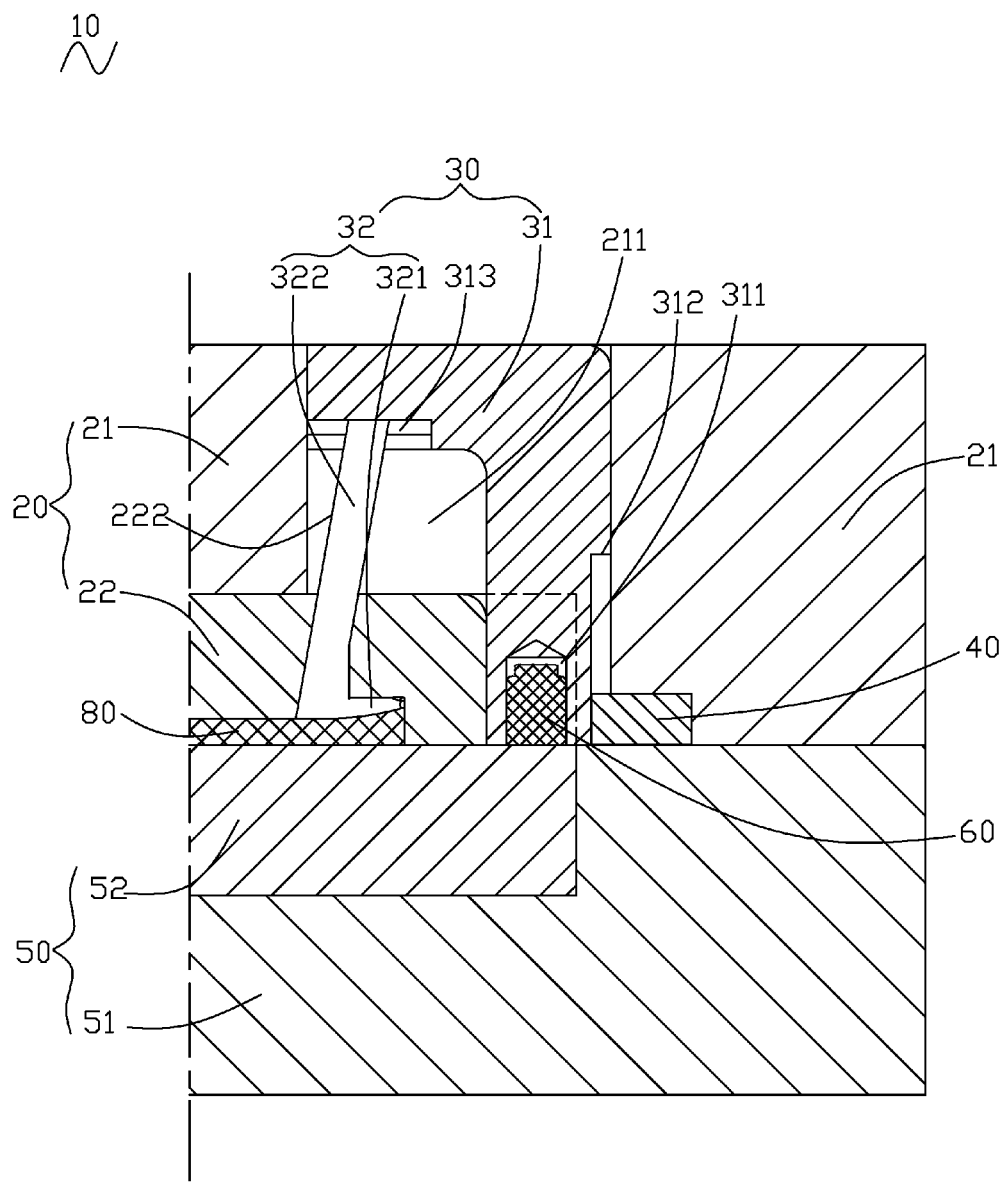
FIG. 2 shows a diagram of a plastic injection mold of the present invention in a close status.
Figure 3:
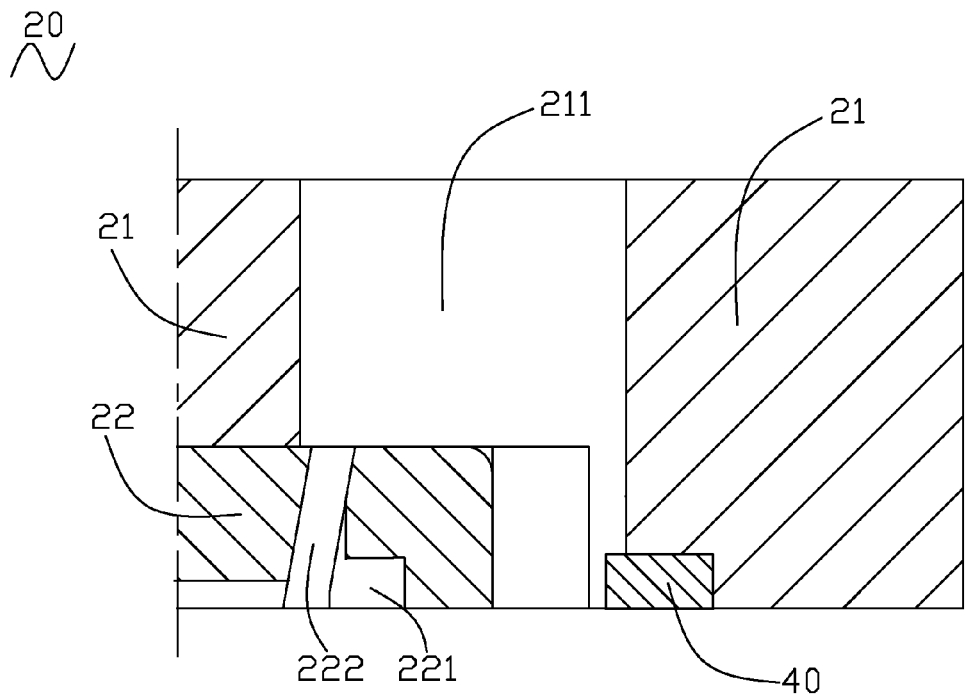
FIG. 3 shows a diagram of a female mold of the present invention.
Figure 4:
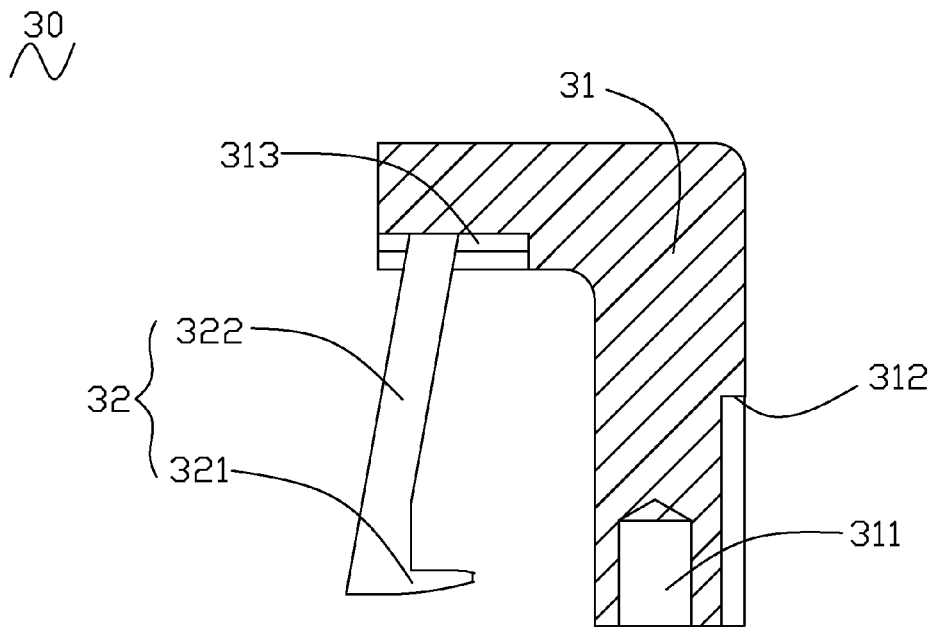
FIG. 4 shows a diagram of an inclined pushing mechanism of the plastic injection mold of the present invention.

Please refer to FIG. 2, FIG. 3 and FIG. 4. The plastic injection mold 10 of the present invention comprises a female mold 20, an inclined pushing mechanism 30, a puller 40, a male mold 50 and a resin parting lock 60.

Please continue to refer to FIG. 3. The female mold 20 comprises a female mold plate 21 and a female mold core 22. An accepting space 211 is formed in the female mold plate 21. An accepting slot 221 and a guide hole 222 connecting with the accepting slot 221 and extending aslant are opened in the female mold core 22.

Please continue to refer to FIG. 4. The inclined pushing mechanism 30 is up and down movably positioned in the accepting space 211 of the female mold 21. The inclined pushing mechanism 30 comprises an inclined pushing seat 31 and an inclined pusher 32. A parting lock hole 311 is hollowly formed at the bottom surface of the inclined pushing seat 31. A trip limit wall 312 is formed at a lateral side of the inclined pushing seat 31. A guide rail 313 is transversely extending in the inclined pushing seat 31. The inclined pusher 32 comprises a molding unit 321 and an inclined pushing bar 322. The molding unit 321 is accepted in the accepting slot 221 of the female mold core 22. One end of the inclined pushing bar 322 passes through the guide hole 222 and is slidably installed on the guide rail 313 of the inclined pushing seat 31.

Please continue to refer to FIG. 2. A male mold 50 is positioned corresponding to the female mold 20. The male mold 50 comprises a male mold plate 51 and a male mold core 52.

The puller 40 is fixed at the bottom surface of the female mold plate 21 and is parallel and level with the aforesaid bottom surface. The puller 40 can act to the trip limit wall 312 so to drive the inclined pushing seat 31 to be moved thereby.

The resin parting lock 60 is fixed on the male mold plate 51 and is in accordance with the parting lock hole 311 of the inclined pushing seat 31. Significantly, the female mold core 22, the male mold core 52 and the molding unit 321 enclose to form a cavity when the plastic injection mold is closed.

Figure 5:
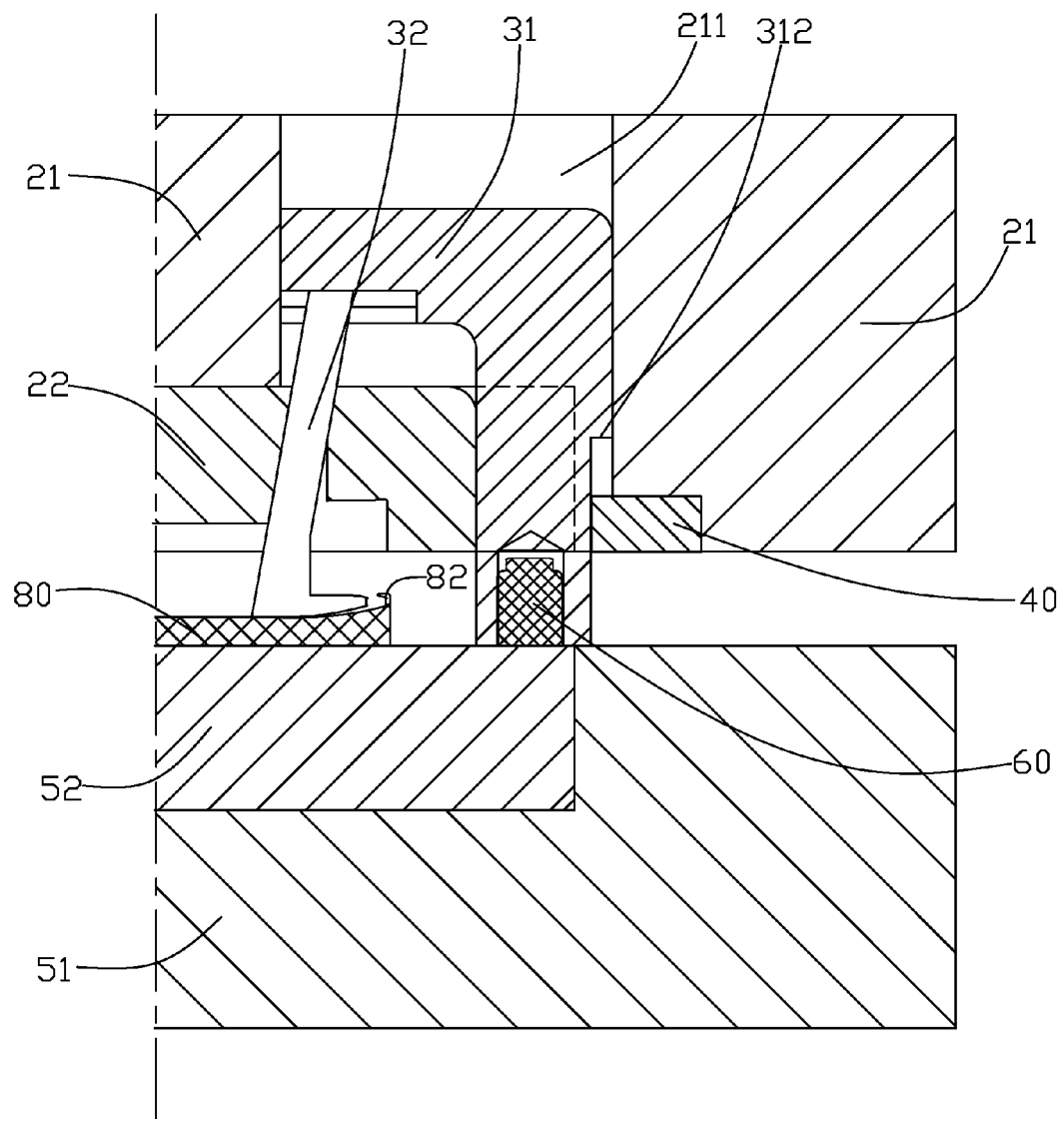
FIG. 5 shows a diagram of a first status of the plastic injection mold according to the present invention in the mold opening process.
Figure 7:
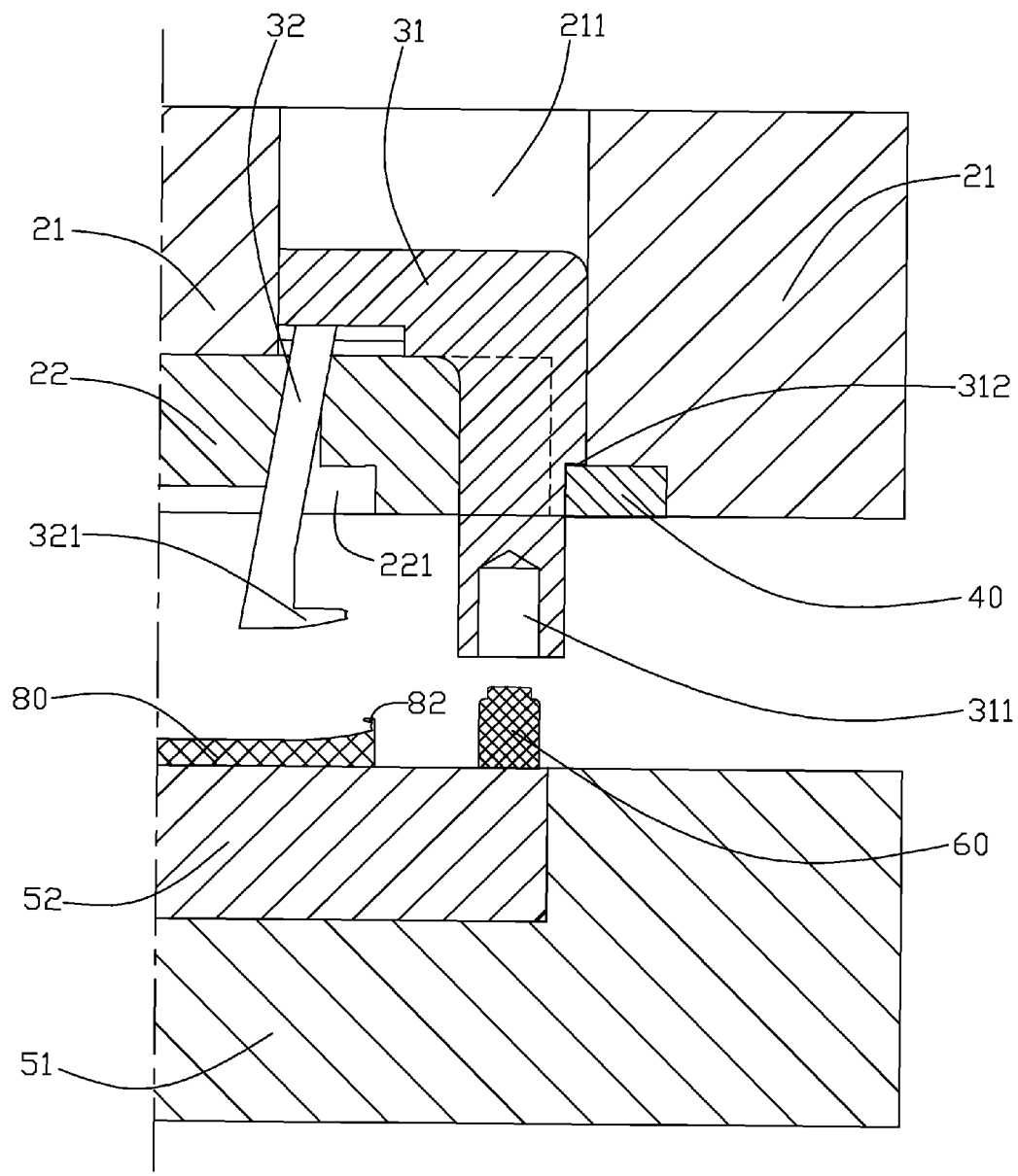
FIG. 7 shows a diagram of a third status of the plastic injection mold according to the present invention in the mold opening process.

Please refer to FIG. 2, FIG. 5 and FIG. 7, which show diagrams of various statuses of the plastic injection mold 10 as manufacturing the product 80 with the barb 82 according to the present invention.

Please continue to refer to FIG. 2, which shows a diagram of a plastic injection mold 10 of the present invention in a close status. The female mold core 22, the male mold core 52 and the molding unit 321 enclose to form the cavity. An barb 82 of the product 80 is formed between the molding unit 321 and the female mold core 22; the resin parting lock 60 is accepted in the resin parting lock hole 311 of the inclined pushing seat 31 and attracts the inclined pushing mechanism 30.

Please refer to FIG. 5. When the plastic injection mold 10 is opened, the male mold and the female mold is separated vertically, the inclined pushing seat 31 of the inclined pushing mechanism 30 is not moved upwards with the female mold 20 by the attraction of the resin parting lock 60. Only the inclined pusher 32 is pushed by the wall of the guide hole 222 and then slides along the guide rail 313 of the inclined pushing seat 31. Accordingly, the inclined pusher 32 is detached from the barb 82 of the injection molded product 80.

Figure 6:
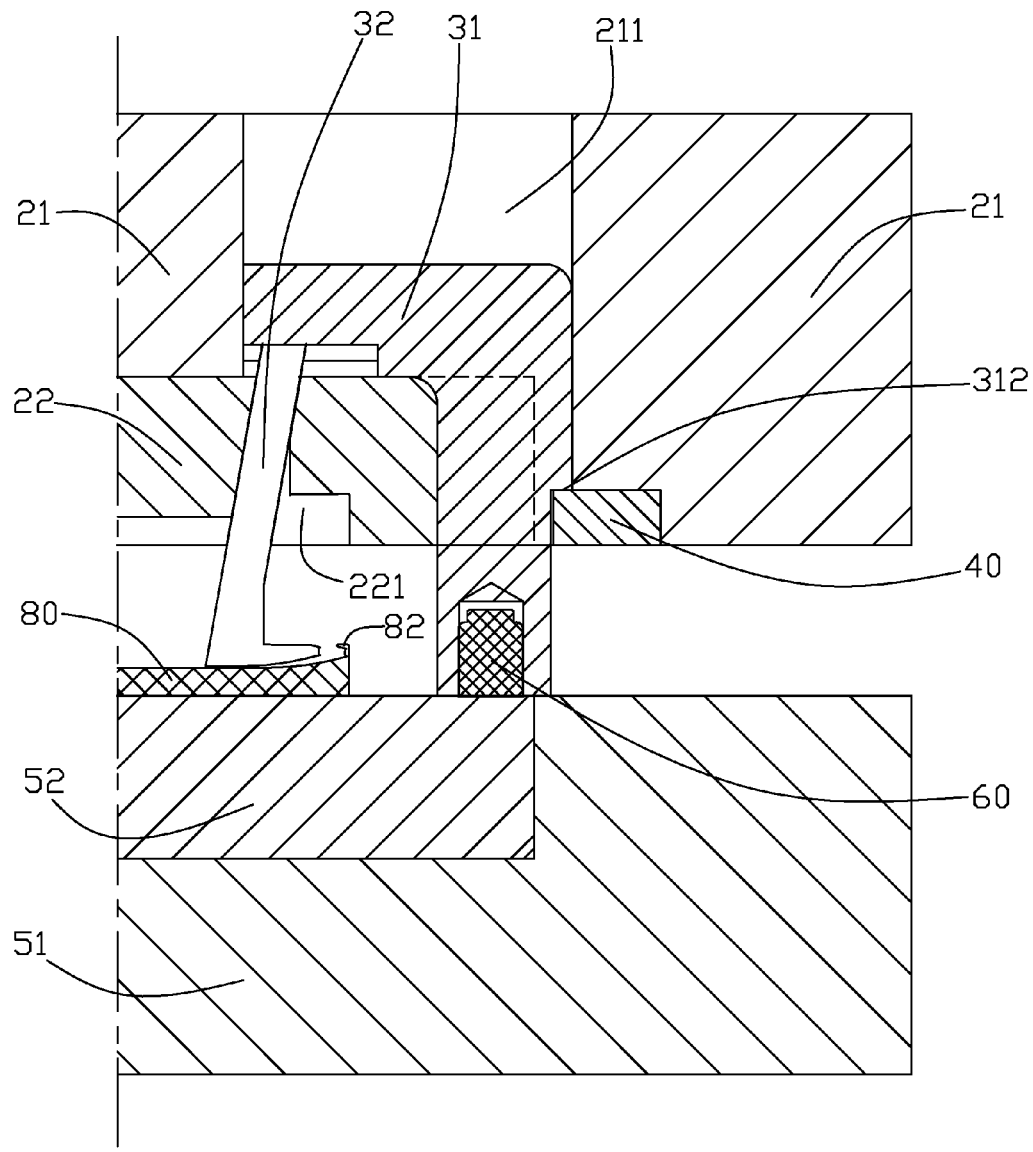
FIG. 6 shows a diagram of a second status of the plastic injection mold according to the present invention in the mold opening process.

Please continue to refer to FIG. 6 and FIG. 7. When the male mold and the female mold is separated and the puller 40 touches a trip limit wall 312 and acts to the trip limit wall 314. Accordingly, the inclined pushing seat 31 of the inclined pushing mechanism 30 is now driven to move. The resin parting lock 60 and the resin parting lock hole 311 is separated. The inclined pushing mechanism 30 is now moved upwards with the female mold 20 and the mold opening process is completed.

As aforementioned, as the plastic injection mold 10 of the present invention is utilized to form the product 80 with barb 82, the slide mechanism of prior art can be replaced by the installed inclined pushing mechanism 30 with functions of the resin parting lock 60 and the puller 40. The plastic injection mold 10 has a simple structure and can be easily designed and manufactured. Accordingly, the plastic injection mold 10 can be utilized to manufacture the product with barb with small size.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A plastic injection mold, comprising:
    a female mold, comprising a female mold plate and a female mold core, and an accepting space is formed in the female mold plate and an accepting slot and a guide hole connecting with the accepting slot and extending aslant are opened in the female mold core;
    a male mold, being positioned corresponding to the female mold and comprising a male mold plate and a male mold core;
    an inclined pushing mechanism, being up and down movably positioned in the accepting space of the female mold, and comprising an inclined pushing seat, relatively movably installed on the female mold plate and an inclined pusher, and a parting lock hole and a transversely extending guide rail are formed in the inclined pushing seat, and the inclined pusher comprises a molding unit and an aslant extending inclined pushing bar, and the molding unit is accepted in the accepting slot, and one end of the inclined pushing bar passes through the guide hole and is slidably installed on the guide rail of the inclined pushing seat;
    a parting lock, being fixed on the male mold plate and in accordance with the parting lock hole of the inclined pushing seat; and
    a puller, being fixed on female mold, and a trip limit wall is formed at a lateral side of the inclined pushing seat and the puller acts to the trip limit wall to drive the inclined pushing seat thereby;
    wherein the female mold core, the male mold core and the molding unit enclose to form a cavity when the plastic injection mold is closed.

2. The plastic injection mold of claim 1, wherein the parting lock is a resin parting lock.

* * * * *